United States Patent
Greiner

(10) Patent No.: US 9,228,466 B2
(45) Date of Patent: Jan. 5, 2016

(54) METHOD FOR OPERATING A DOSING VALVE, AND CORRESPONDING INTERNAL COMBUSTION ENGINE

(71) Applicant: VOLKSWAGEN AKTIENGESELLSCHAFT, Wolfsburg (DE)

(72) Inventor: Michael Greiner, Magdeburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 14/408,408

(22) PCT Filed: Apr. 26, 2013

(86) PCT No.: PCT/EP2013/058700
§ 371 (c)(1),
(2) Date: Dec. 16, 2014

(87) PCT Pub. No.: WO2013/185973
PCT Pub. Date: Dec. 19, 2013

(65) Prior Publication Data
US 2015/0226103 A1 Aug. 13, 2015

(30) Foreign Application Priority Data
Jun. 16, 2012 (DE) .......................... 10 2012 011991

(51) Int. Cl.
*F01N 5/02* (2006.01)
*F01N 3/20* (2006.01)
(Continued)

(52) U.S. Cl.
CPC ............ *F01N 3/2066* (2013.01); *F01N 3/0814* (2013.01); *F01N 3/2006* (2013.01);
(Continued)

(58) Field of Classification Search
CPC ....... F01N 3/035; F01N 3/106; F01N 3/2066; F01N 11/002; F01N 2240/02; F01N 2340/02; F01N 2560/06; F01N 2560/14; F01N 2610/02; F01N 2610/11; F01N 2610/1453; F01N 2610/148; F01N 2900/1404; F01N 2900/1811; F02B 29/0443; F02D 41/0077; F02M 25/0709; F02M 25/0719
USPC ........... 60/274, 277, 278, 285, 286, 295, 297, 60/298, 299, 301, 320, 324
See application file for complete search history.

(56) References Cited

U.S. PATENT DOCUMENTS

| 2007/0092413 A1 | 4/2007 | Hirata et al. |
| 2009/0151335 A1 | 6/2009 | Hirata et al. |

(Continued)

FOREIGN PATENT DOCUMENTS

| DE | 102 59 926 A1 | 7/2004 |
| DE | 10 2007 038 242 A1 | 2/2009 |

(Continued)

OTHER PUBLICATIONS

Search Report for German Application No. 10 2012 011 991.7, mailed Aug. 20, 2012.

(Continued)

*Primary Examiner* — Thomas Denion
*Assistant Examiner* — Jorge Leon, Jr.
(74) *Attorney, Agent, or Firm* — Pearl Cohen Zedek Latzer Baratz LLP

(57) ABSTRACT

The present invention relates to a method for operating an internal combustion engine. The internal combustion engine comprises a charge-air cooler for cooling charge air and comprises a dosing valve. The charge air comprises exhaust gases which are conducted to the charge air cooler, with an adjustable exhaust-gas recirculation rate, from an exhaust tract of the internal combustion engine. In the method, a dosing valve temperature of the dosing valve is determined, and a charge-air temperature of the charge air is detected. Coolant is supplied to the dosing valve and to the charge-air cooler by means of a common adjustable coolant pump as a function of the dosing valve temperature. Furthermore, an exhaust-gas recirculation rate is adjusted as a function of the charge-air temperature and the dosing valve temperature.

13 Claims, 3 Drawing Sheets

(51) Int. Cl.
*F02B 29/04* (2006.01)
*F01N 3/08* (2006.01)
*F01N 9/00* (2006.01)
*F01N 3/10* (2006.01)
*F01N 11/00* (2006.01)
*F02M 25/07* (2006.01)
*F02D 41/00* (2006.01)

(52) U.S. Cl.
CPC .............. *F01N 9/00* (2013.01); *F01N 11/00* (2013.01); *F02B 29/0406* (2013.01); *F02B 29/0443* (2013.01); *F02B 29/0493* (2013.01); *F02D 41/0065* (2013.01); *F02M 25/0718* (2013.01); *F01N 3/106* (2013.01); *F01N 11/002* (2013.01); *F01N 2240/02* (2013.01); *F01N 2340/02* (2013.01); *F01N 2560/06* (2013.01); *F01N 2560/14* (2013.01); *F01N 2610/02* (2013.01); *F01N 2610/11* (2013.01); *F01N 2610/148* (2013.01); *F01N 2610/1453* (2013.01); *F01N 2900/1404* (2013.01); *F01N 2900/1811* (2013.01); *F01N 2900/1821* (2013.01); *F02D 41/0077* (2013.01); *F02M 25/0709* (2013.01); *F02M 25/0719* (2013.01); *Y02T 10/24* (2013.01)

(56) References Cited

U.S. PATENT DOCUMENTS

| | | | |
|---|---|---|---|
| 2009/0293460 | A1 | 12/2009 | Hirata et al. |
| 2010/0242439 | A1* | 9/2010 | Domon et al. ..... B01D 53/9431 60/274 |

FOREIGN PATENT DOCUMENTS

| | | |
|---|---|---|
| DE | 10 2008 035 747 | 4/2009 |
| DE | 10 2009 032 978 A1 | 1/2010 |
| DE | 10 2008 056 337 | 5/2010 |
| DE | 10 2009 006 966 A1 | 8/2010 |
| DE | 10 2009 014 361 A1 | 9/2010 |
| EP | 1431540 | 6/2004 |
| EP | 1691046 A1 | 8/2006 |
| EP | 2213859 | 8/2010 |
| GB | 2453831 | 4/2009 |
| JP | 2005 127 318 | 5/2005 |
| WO | WO 2005/028827 A1 | 3/2005 |
| WO | WO 2010/108574 A1 | 9/2010 |

OTHER PUBLICATIONS

International Search Report for International Application No. PCT/EP2013/058700, mailed Sep. 4, 2013.

* cited by examiner

METHOD FOR OPERATING A DOSING VALVE, AND CORRESPONDING INTERNAL COMBUSTION ENGINE

CROSS-REFERENCE TO RELATED APPLICATIONS

This application is a National Phase Application of PCT International Application No. PCT/EP2013/058700, International Filing Date Apr. 26, 2013, claiming priority of German Patent Application No. 10 2012 011 991.7, filed Jun. 16, 2012, which is hereby incorporated by reference.

BACKGROUND OF THE INVENTION

The present invention relates to a method for operating a metering valve for introducing a urea-water solution into the exhaust train of an internal combustion engine, and it also relates to a method for operating an internal combustion engine having a charge air cooler and a metering valve.

In an internal combustion engine, for example, the internal combustion engine of a passenger car or a truck, the internal combustion engine can give rise to high temperatures on the internal combustion engine itself as well as on components of the internal combustion engine, for example, in the exhaust train of the internal combustion engine, and these temperatures can destroy or damage parts and components in the areas exposed to these temperatures.

German patent application DE 10 2009 014 361 A1 relates, for example, to an exhaust-gas treatment unit for a vehicle with an SCR catalytic converter for reducing nitrogen oxides in the exhaust gas of an internal combustion engine. A turbocharger is installed upstream from the SCR catalytic converter. A metering unit serves to introduce a reductant into the exhaust gas at a feed site that is preferably arranged upstream from a turbine of the turbocharger. The metering unit can be actuated by means of a control unit, whereby it can also be provided that an aqueous urea solution is introduced into the exhaust gas system if very high exhaust-gas temperatures would otherwise lead to severe thermal stress to the turbine. In this case, aside from the need to reduce nitrogen oxide, the introduction of the aqueous urea solution can be provided as a measure to protect against temperatures at which exhaust gases cool off due to the application of evaporation heat.

In the case of supercharged engines, for example, turbo-engines, charge air coolers are used in order to ensure that air heated up by the supercharging is cooled off, as a result of which a higher charging density is made available to the combustion process in the cylinder. In conjunction with a low-pressure exhaust gas recirculation system, exhaust gases are introduced into the compressor together with the intake air. The compressed charge air is conveyed through the charge air cooler and it is finally fed to the combustion process after having been cooled off to a considerable extent. During the operation of such a low-pressure exhaust gas recirculation system, the water contained in the exhaust gas can condense in the charge air cooler and, if it accumulates, it can damage the charge air cooler and the internal combustion engine. In this context, German patent application DE 10 2009 006 966 A1 relates to a method for regulating the charge air cooler that is located in a coolant circuit of an internal combustion engine and that cools the charge air of the internal combustion engine. Here, the cooling capacity of the charge air cooler is set by means of an adjustable circulation pump. German patent application DE 10 2008 035 747 A1 relates to an exhaust gas recirculation cooling system having several coolers. In order to avoid the formation of deposits on the cooler, so-called fouling (overcooling and condensation), the exhaust gas recirculation flow through and around several coolers is coordinated as a function of the operating conditions.

German patent application DE 10 2007 038 242 A1 relates to a method for recirculating exhaust gas in order to feed the largest possible portion of exhaust gas that has been thoroughly mixed with fresh air back to an internal combustion engine at all of the operating points while reliably avoiding condensation effects. For this purpose, the portion of exhaust gas that is removed from the outlet line and fed back in upstream from a compressor in the inlet line is controlled and regulated as a function of the temperature in the inlet line.

Finally, German patent application DE 10 2009 006 966 A1 relates to a method for regulating a charge air cooler with which the cooling capacity of the charge air cooler is set during the operation of the internal combustion engine as a function of two threshold values for the temperature of the charge air cooler. The cooling capacity of the charge air cooler can be set, for instance, by means of an adjustable circulation pump. In this manner, it is possible to lower the inertia of the cooling system.

In the case of a supercharged internal combustion engine, for example, a diesel engine with a turbocharger, in order to treat the exhaust gas, a urea-water solution (HWL) can be injected into the exhaust train, for example, upstream from an SCR catalytic converter (SCR=selective catalytic reduction) and upstream from a diesel particulate filter (DPF) via a metering valve, a so-called SCR metering valve. Depending on the installation position of the metering valve in the exhaust train of the internal combustion engine, the metering valve can be exposed to very high temperatures.

SUMMARY OF THE INVENTION

Therefore, the objective of the present invention is to protect the metering valve against excess temperatures.

According to the present invention, this objective is achieved by a method to operate a metering valve for introducing a urea-water solution into the exhaust train of an internal combustion engine, a method for operating an internal combustion engine, an internal combustion engine, and a vehicle.

According to the present invention, a method is being put forward for operating a metering valve for introducing a urea-water solution into the exhaust train of an internal combustion engine. With this method, the temperature of the metering valve is determined and a coolant is fed to the metering valve as a function of the temperature of the metering valve. Thanks to the cooling of the metering valve with the coolant, damage to or destruction of the metering valve due to excess temperatures can be prevented.

According to one embodiment, the internal combustion engine also has a charge air cooler to which the coolant is fed in order to cool the charge air. The coolant is fed directly to the metering valve and to the charge air cooler by means of a shared adjustable coolant pump. A low-temperature water cooling circuit is normally used to cool the charge air cooler, and this water cooling circuit is generally at a lower temperature than a water cooling circuit for cooling the internal combustion engine. Since the metering valve is cooled with the same coolant as the charge air cooler, the metering valve can be kept at a much lower temperature than the cooling water temperature of the internal combustion engine. In this manner, wear and tear as well as damage to the metering valve can be reliably prevented. Since the metering valve and the charge air cooler are supplied with the same coolant by means of a shared coolant pump, no additional pumps or adjusting valves are needed, as a result of which the cooling of the metering valve can be achieved cost-effectively.

According to another embodiment, the charge air that is cooled by the charge air comprises exhaust gases that are conveyed from the exhaust train to the charge air cooler at an adjustable exhaust gas recirculation rate. Moreover, with this method, the temperature of the charge air is detected and the exhaust gas recirculation rate is set as a function of the temperature of the charge air and of the temperature of the metering valve. Under certain operating conditions, for example, at low outdoor temperatures, it can happen that water condenses in the charge air cooler, as a result of which damage to the charge air cooler or to the internal combustion engine is possible. Switching off or slowing down the shared coolant pump can prevent water from condensing in the charge air cooler, but then there is the risk that the metering valve will overheat. If, under these operating conditions, the charge air cooler is not charged with exhaust gas or with less exhaust gas from the exhaust gas recirculation system, it can be prevented that water will condense in the charge air cooler since, due to the lower exhaust gas recirculation rate, less exhaust gas containing water is fed into the charge air cooler, and at the same time, the cooling of the metering valve can be ensured. In other words, this ensures that the metering valve is constantly supplied with cooling water from the low-temperature water cooling circuit, but that the exhaust gas recirculation system, especially a low-pressure exhaust gas recirculation system, is adjusted under certain operating conditions in such a way that no impermissibly large volumes of water collect in the charge air cooler.

According to the present invention, a method for operating an internal combustion engine is also being put forward. The internal combustion engine has a metering valve as well as a charge air cooler for cooling charge air. The metering valve can be arranged in the exhaust train of the internal combustion engine for introducing a urea-water solution into the exhaust train. However, the metering valve can also be any other metering valve of the internal combustion engine that has to be protected against excess temperatures. The charge air comprises exhaust gases that are conveyed from the exhaust train of the internal combustion engine to the charge air cooler at an adjustable exhaust gas recirculation rate. With this method, the temperature of the metering valve is determined and the temperature of the charge air is detected. A coolant is fed to the metering valve and to the charge air cooler by means of a shared coolant pump as a function of the temperature of the metering valve. The exhaust gas recirculation rate is set as a function of the temperature of the charge air and of the temperature of the metering valve. In this manner, the metering valve can be reliably kept at the desired temperature by means of the low-temperature water cooling circuit of the charge air cooler and, at the same time, by setting, especially reducing, the exhaust gas recirculation rate it can be ensured that, under certain operating conditions particularly as a function of the temperature of the charge air and of the temperature of the metering valve, not too much water will condense in the charge air cooler. This translates into a cost-effective way to cool the metering valve.

According to one embodiment, in the above-mentioned method, the exhaust gas recirculation rate is reduced if the temperature of the charge air is less than a value that is dependent on the ambient temperature, and if the temperature of the metering valve is greater than a predetermined threshold value. If the temperature of the metering valve is greater than the predetermined threshold value, it becomes necessary to cool off the metering valve in order to prevent it from being damaged. For this reason, in this state, the coolant pump of the low-temperature cooling circuit cannot be slowed down. In order to avoid a condensation of water in the charge air cooler in this state, the exhaust gas recirculation rate can be reduced if the temperature of the charge air is less than the value that is dependent on the ambient temperature. The value that is dependent on the ambient temperature can be determined, for example, as a function of the ambient temperature by means of an electronic system of the internal combustion engine.

According to another embodiment, the temperature of the charge air is detected downstream from the charge air cooler. In this manner, a possible condensation of water in the charge air cooler as well as a condensation of water in the intake train of the internal combustion engine between the charge air cooler and the internal combustion engine can be determined.

According to another embodiment, as an alternative or in addition to the detection of the temperature of the charge air, it is determined whether water from the charge air has condensed in the charge air cooler. The exhaust gas recirculation rate is adjusted as a function of whether water from the charge air has condensed in the charge air cooler, and as a function of the temperature of the metering valve. The determination as to whether or not water from the charge air has condensed in the charge air cooler can be carried out, for example, on the basis of a model or on the basis of measured state variables of the charge air, or else by means of a suitable moisture sensor.

According to another embodiment, the coolant is fed to the metering valve and to the charge air cooler by setting the pumping capacity of the coolant pump. In this manner, the temperature of the metering valve can be set to the desired value and, at the same time, a suitable quantity of coolant can be fed to the charge air cooler. If there is a risk that water from the charge air will condense in the charge air cooler, the pumping capacity of the coolant pump can be reduced, for example, in such a way that the metering valve is still cooled just barely sufficiently. In this manner, the condensation of water in the charge air cooler can be largely prevented. If there is nevertheless a risk of water condensation, then, as described above, the exhaust gas recirculation rate can be reduced. If a greater cooling capacity is required on the part of the charge air cooler, the pumping capacity of the coolant pump can be set correspondingly high. In this manner, sufficient coolant is fed to the charge air cooler and, at the same time, the metering valve is cooled.

According to another embodiment, the metering valve is arranged at an outlet of an oxidation catalytic converter that is arranged between an exhaust manifold of the internal combustion engine and the metering valve. The temperature of the metering valve is determined at the outlet of the oxidation catalytic converter. Such a temperature sensor might already be necessary anyway in order to control the exhaust gas temperature as well as in conjunction with an SCR catalytic converter and a diesel particulate filter, so that the detection of the temperature of the metering valve can be achieved cost-effectively by means of this temperature sensor.

The method described above can especially be used advantageously if the distance between the exhaust manifold and the oxidation catalytic converter is relatively small, especially if this distance is less than approximately 600 mm, since, in this case, the temperature stress to the metering valve is very high.

Moreover, according to the present invention, an internal combustion engine is being put forward that comprises a metering valve for introducing a urea-water solution into the exhaust train of the internal combustion engine, a temperature sensor for detecting the temperature of the metering valve, a cooling circuit with a coolant pump and a control unit. The cooling circuit can especially be a so-called low-temperature cooling circuit that is provided, for instance, to cool a charge air cooler of the internal combustion engine. The cooling circuit is coupled to the metering valve in order to feed coolant to the metering valve. The control unit is coupled to the temperature sensor and to the coolant pump, and it is capable of determining the temperature of the metering valve and capable of feeding the coolant to the metering valve as a function of the temperature of the metering valve. In this manner, overheating of the metering valve in the exhaust train can be reliably prevented.

Furthermore, according to the present invention, an internal combustion engine is put forward that comprises a metering valve, a charge air cooler for cooling charge air, an exhaust gas recirculation system, a first temperature sensor for detecting the temperature of the metering valve, a second temperature sensor for detecting the temperature of the charge air, a cooling circuit with a coolant pump, and a control unit. The exhaust gas recirculation system is capable of feeding exhaust gases from the exhaust train of the internal combustion engine to the charge air at an adjustable exhaust gas recirculation rate. The cooling circuit is coupled to the metering valve and to the charge air cooler in order to feed coolant to the metering valve and to the charge air cooler. The cooling circuit is especially a so-called low-temperature cooling circuit whose coolant temperature is lower than the coolant temperature of the internal combustion engine that is used to cool the cylinders of the internal combustion engine. The control unit is coupled to the first temperature sensor, to the second temperature sensor, to the coolant pump and to a setting means that serves to set the exhaust gas recirculation rate. The setting means that serves to set the exhaust gas recirculation rate can comprise, for example, a control valve in the exhaust gas recirculation system. The control unit is configured to determine the temperature of the metering valve, to determine the temperature of the charge air, and to feed coolant to the metering valve and to the charge air cooler as a function of the temperature of the metering valve. Moreover, the control unit is configured to set the exhaust gas recirculation rate as a function of the temperature of the charge air and of the temperature of the metering valve.

The internal combustion engines described above are thus configured to carry out the method described above and consequently, they also encompass the advantages of the above-mentioned method.

Finally, according to the present invention, a vehicle with an internal combustion engine as described above is being put forward.

BRIEF DESCRIPTION OF THE DRAWINGS

The present invention is explained below in detail with reference to the drawings.

DETAILED DESCRIPTION OF THE INVENTION

Figure 1:
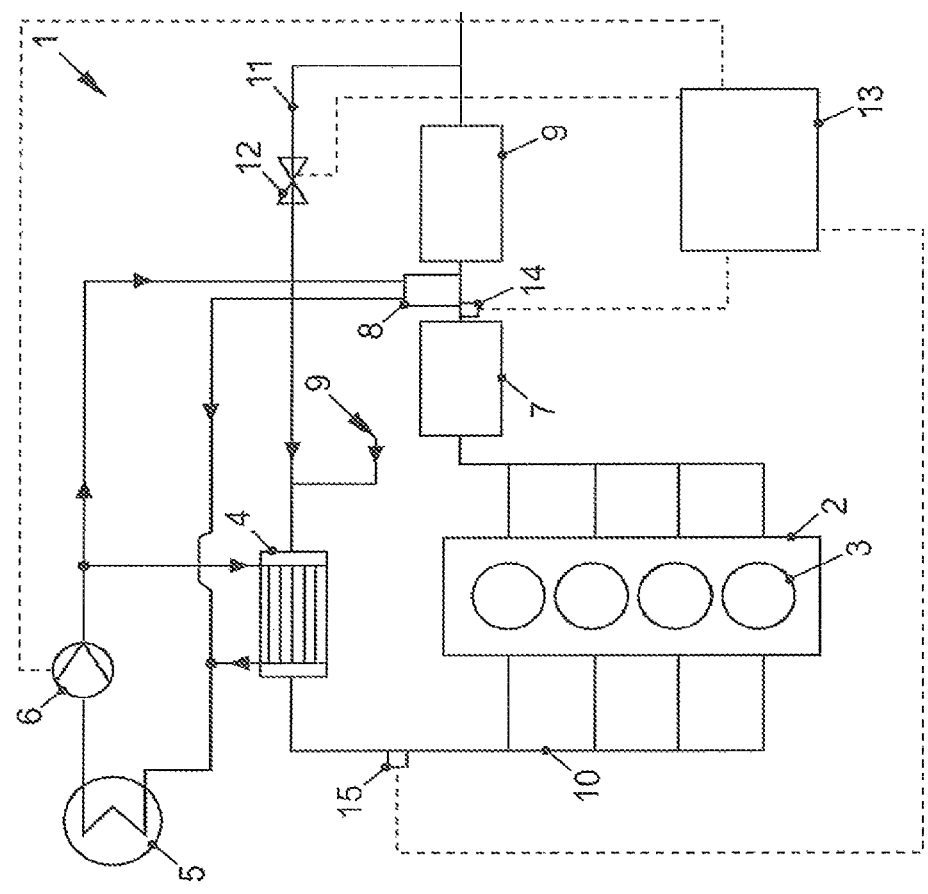
FIG. 1 schematically shows an internal combustion engine according to an embodiment of the present invention.

FIG. 1 shows an internal combustion engine 1 that comprises an engine block 2 with four cylinders 3, a charge air cooler 4, a low-temperature water cooler 5, an adjustable water pump 6, an oxidation catalytic converter 7, an SCR metering valve 8, and an SCR catalytic converter with a diesel particulate filter 9. Additional components of the internal combustion engine 1 such as, for example, an exhaust gas turbocharger, a compressor and a cooling system for the cylinders 3 have been omitted from FIG. 1 for the sake of clarity. Intake air 9 is fed to the intake side 10 of the internal combustion engine 1 via the charge air cooler 4. Exhaust gas can be fed into the intake air 9 via an exhaust gas recirculation system 11. The exhaust gas recirculation system 11 is, for example, a low-pressure exhaust gas recirculation system that withdraws exhaust gases downstream from the SCR catalytic converter and/or from the diesel particulate filter 9 and feeds them into the intake air 9. The exhaust gas recirculation system 11 comprises an exhaust gas recirculation valve 12 for setting an exhaust gas recirculation rate via the exhaust gas recirculation system 11. The adjustable water pump 6 regulates the water flow in a low-temperature water cooling circuit leading from the low-temperature water cooler 5 to the charge air cooler 4 and the metering valve 8. Exhaust gases from the cylinders 3 are conveyed through the oxidation catalytic converter 7 into the SCR catalytic converter and the diesel particulate filter 9. For the exhaust gas treatment in the SCR catalytic converter, an aqueous urea solution, a so-called urea-water solution (HWL), is fed into the exhaust gas via the metering valve 8.

Figure 2:
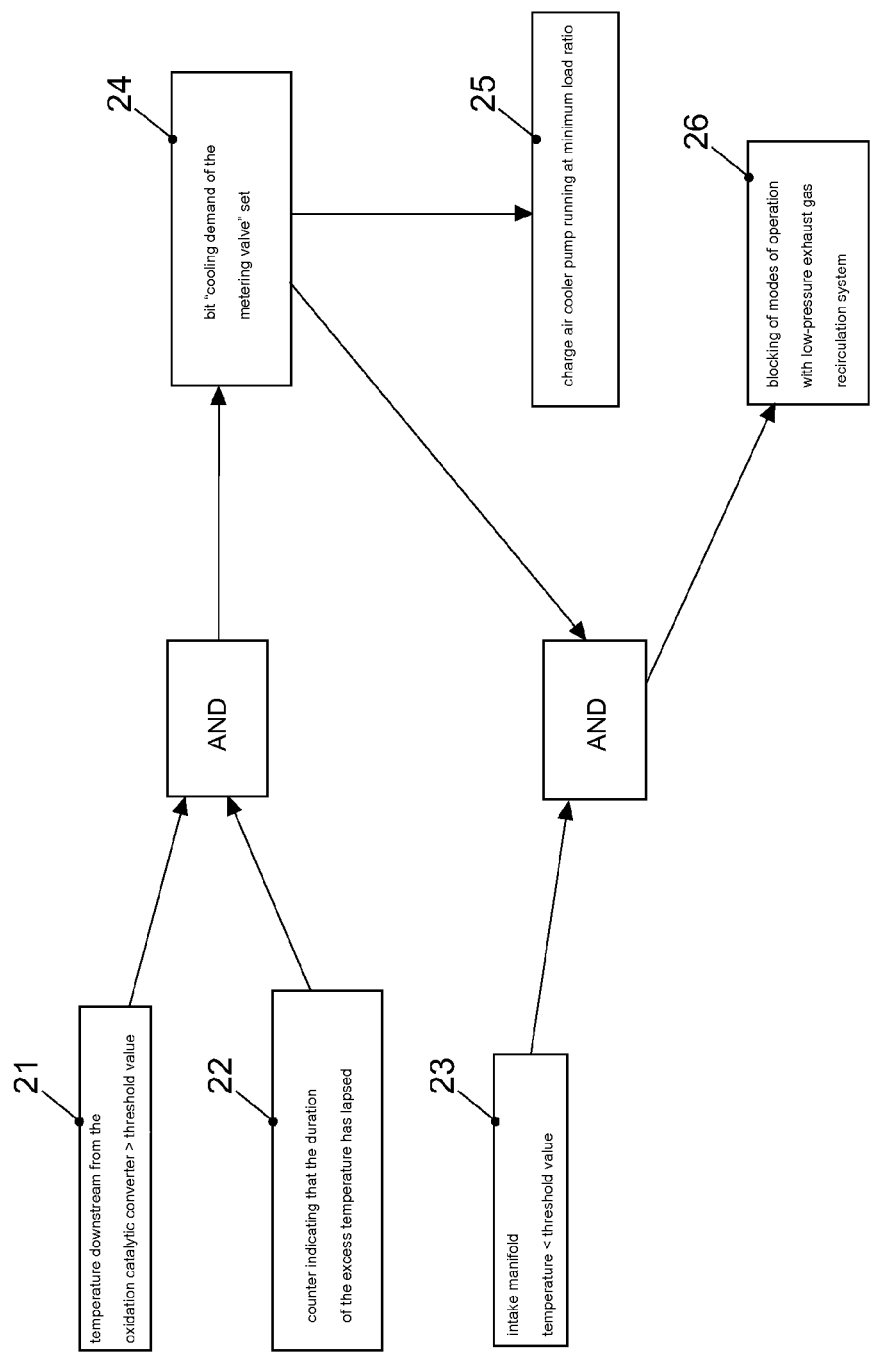
FIG. 2 shows the mode of operation of a method according to the invention for operating an internal combustion engine.

As can be seen in FIG. 1, the metering valve 8 and the charge air cooler 4 are situated in the same low-temperature water coolant circuit and are thus always cooled at the same time. However, there are operating conditions of the internal combustion engine 1 under which the metering valve 8 has to be cooled—although the charge air cooler 4 must not be cooled—in order to prevent condensation and water accumulation in the charge air cooler resulting from the fact that the exhaust gas that was recirculated on the low-pressure side is cooled to below the dew point. In order to achieve this, in addition to the pumping capacity of the water pump 6, the exhaust gas recirculation rate via the exhaust gas recirculation system 11 is also set by means of the exhaust gas recirculation valve 12, as will be explained below with reference to FIG. 2. For this purpose, a control unit 13 detects the temperature downstream from the oxidation catalytic converter 7 by means of a first temperature sensor 14 and it detects the temperature of the charge air in the intake pipe 10 by means of a second temperature sensor 15. If the temperature downstream from the oxidation catalytic converter exceeds a threshold value, that is to say, if the temperature of the metering valve is above a certain threshold value (Block 21 in FIG. 2), and if this excess temperature continues for a certain period of time (Block 22), then a bit is set for a cooling demand of the metering valve (Block 24). Once the bit for the cooling demand of the metering valve has been set (Block 24), the water pump 6 runs at least at a minimal pulse duty factor (Block 25). Once the bit for the cooling demand of the metering valve has been set (Block 24) and once the temperature in the intake pipe 10 is below a predetermined threshold value (Block 23), the low-pressure exhaust gas recirculation system is blocked or at least reduced (Block 26). Thus, on the one hand, cooling of the metering valve 8 is always ensured and, on the other hand, an accumulation of water in the charge air cooler 4 is prevented. It is not necessary to switch off the low-temperature water circuit. In addition, an emission benefit can arise since the low-pressure exhaust gas recirculation system is only switched off (in order to protect the components) if condensation conditions are present in the charge air cooler.

If a cooling demand of the charge air cooler is present, the water pump is set accordingly.

If the temperature downstream from the oxidation catalytic converter drops below another predetermined threshold value for a certain period of time, so that no cooling of the metering valve is necessary, then the bit for the cooling demand of the metering valve is deleted. In this case, blocking or reducing the low-pressure exhaust gas recirculation system (Block 26) is not necessary, but rather, in case of a possible water condensation in the charge air cooler, the pumping capacity of the water pump 6 can be reduced accordingly. If the intake pipe temperature rises above another predetermined threshold value for a predetermined period of time, then the blocking or reduction of the low-pressure exhaust gas recirculation system (Block 26) is likewise canceled.

Figure 3:
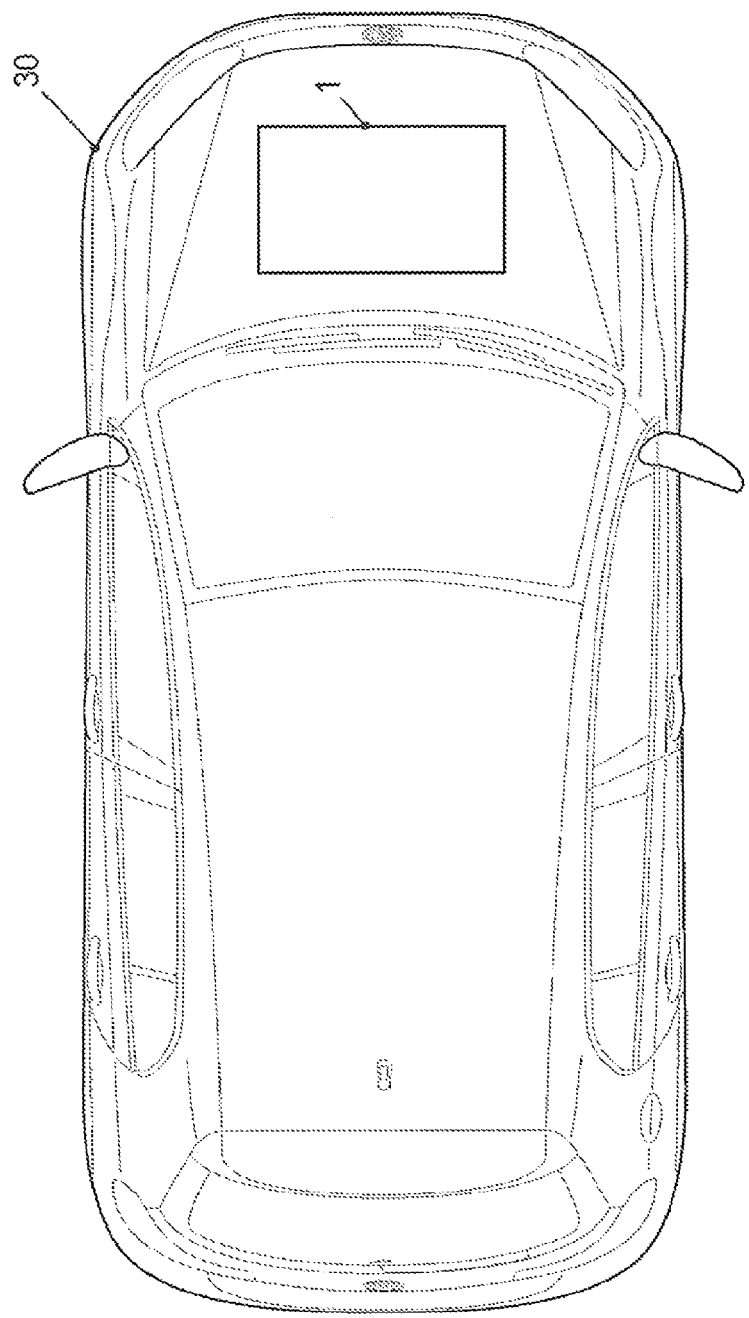
FIG. 3 shows a vehicle according to an embodiment of the present invention.

FIG. 3 shows a vehicle 30 with the internal combustion engine 1. Particularly in case of an internal combustion engine 1 having a compact design, the distance between the exhaust manifold of the internal combustion engine 1 and the oxidation catalytic converter 7 can be relatively small. In this case, relatively high temperatures prevail at the outlet of the oxidation catalytic converter 7 so that the metering valve 8 has to be protected against these high temperatures in order to prevent temperature-related damage to the metering valve 8. This can occur in particular with compact internal combustion engines in which this distance is, for example, in the range from 40 cm to 60 cm.

The invention claimed is:

1. A method for operating a metering valve for introducing a urea-water solution into an exhaust train of an internal combustion engine, wherein the internal combustion engine also has a charge air cooler to which the coolant is fed in order to cool charge air, whereby the method comprises:
   determining a temperature of the metering valve,
   feeding a coolant to the metering valve as a function of the temperature of the metering valve, and
      feeding the coolant to the metering valve and to the charge air cooler by means of a shared adjustable coolant pump.

2. The method according to claim 1, wherein the charge air comprises exhaust gases that are conveyed from the exhaust train to the charge air cooler at an adjustable exhaust gas recirculation rate, whereby the method further comprises:
   detecting a temperature of the charge air, and
   setting the exhaust gas recirculation rate as a function of the temperature of the charge air and of the temperature of the metering valve.

3. The method according to claim 1, wherein the charge air comprises exhaust gases that are conveyed from the exhaust train to the charge air cooler at an adjustable exhaust gas recirculation rate, whereby the method further comprises:
   determining whether water from the charge air has condensed in the charge air cooler, and
   setting the exhaust gas recirculation rate as a function of whether water from the charge air has condensed in the charge air cooler, and as a function of the temperature of the metering valve.

4. The method according to claim 1, wherein the metering valve is arranged at an outlet of an oxidation catalytic converter that is arranged between an exhaust manifold of the internal combustion engine and the metering valve, and wherein determining the temperature of the metering valve comprises determining a temperature at the outlet of the oxidation catalytic converter.

5. The method according to claim 4, wherein a distance between the exhaust manifold and the oxidation catalytic converter is less than 600 mm.

6. A method for operating an internal combustion engine, wherein the internal combustion engine has a metering valve as well as a charge air cooler to cool charge air, whereby the charge air comprises exhaust gases that are conveyed from an exhaust train of the internal combustion engine to the charge air cooler at an adjustable exhaust gas recirculation rate, whereby the method comprises:
   determining a temperature of the metering valve,
   detecting a temperature of the charge air,
   feeding a coolant to the metering valve and to the charge air cooler by means of a shared coolant pump as a function of the temperature of the metering valve, and
   setting the exhaust gas recirculation rate as a function of the temperature of the charge air and of the temperature of the metering valve.

7. The method according to claim 6, wherein the metering valve is arranged in the exhaust train of the internal combustion engine for introducing a urea-water solution into the exhaust train.

8. The method according to claim 6, wherein the exhaust gas recirculation rate is reduced if the temperature of the charge air is less than a value that is dependent on an ambient temperature, and if the temperature of the metering valve is greater than a predetermined threshold value.

9. The method according to claim 6, wherein detecting the temperature of the charge air comprises detecting the temperature of the charge air downstream from the charge air cooler.

10. The method according to claim 6, wherein feeding the coolant to the metering valve and to the charge air cooler further comprises setting a pumping capacity of the coolant pump.

11. An internal combustion engine, having:
   a metering valve for introducing a urea-water solution into an exhaust train of the internal combustion engine,
   a temperature sensor for detecting a temperature of the metering valve,
   a charge air cooler to which coolant is fed in order to cool charge air,
      a cooling circuit with a coolant pump, whereby the cooling circuit is coupled to the metering valve in order to feed the coolant to the metering valve, and
   a control unit that is coupled to the temperature sensor and to the coolant pump, and that is configured to determine a temperature of the metering valve and to feed coolant to the metering valve and to the charge air cooler as a function of the temperature of the metering valve.

12. A vehicle comprising the internal combustion engine according to claim 11.

13. An internal combustion engine, having:
   a metering valve,
   a charge air cooler for cooling charge air,
   an exhaust gas recirculation system that feeds exhaust gases from an exhaust train of the internal combustion engine to the charge air at an adjustable exhaust gas recirculation rate,
   a first temperature sensor for detecting a temperature of the metering valve,
   a second temperature sensor for detecting a temperature of the charge air,
   a cooling circuit with a coolant pump, whereby the cooling circuit is coupled to the metering valve and to the charge air cooler in order to feed coolant to the metering valve and to the charge air cooler, and
   a control unit that is coupled to the first temperature sensor, to the second temperature sensor, to the coolant pump and to a control valve that serves to set the exhaust gas recirculation rate and that is configured to determine the temperature of the metering valve, to determine the temperature of the charge air, to feed coolant to the metering valve and to the charge air cooler as a function of the temperature of the metering valve, and to set the exhaust gas recirculation rate as a function of the temperature of the charge air and of the temperature of the metering valve.

* * * * *